United States Patent
Saito et al.

(10) Patent No.: US 7,117,963 B2
(45) Date of Patent: Oct. 10, 2006

(54) APPARATUS FOR CONTROLLING A DRIVING FORCE OF AN ELECTRIC VEHICLE

(75) Inventors: Osamu Saito, Saitama (JP); Yusuke Tatara, Saitama (JP); Tetsuya Hasebe, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 288 days.

(21) Appl. No.: 10/675,952

(22) Filed: Oct. 2, 2003

(65) Prior Publication Data

US 2004/0065490 A1  Apr. 8, 2004

(30) Foreign Application Priority Data

Oct. 3, 2002 (JP) .......................... P.2002-291334

(51) Int. Cl.
*B60K 1/00* (2006.01)
(52) U.S. Cl. ..................... 180/65.1; 180/65.2; 701/22
(58) Field of Classification Search .................... None
See application file for complete search history.

(56) References Cited

U.S. PATENT DOCUMENTS

| | | | |
|---|---|---|---|
| 5,655,990 A | * | 8/1997 | Ooyama et al. ............. 477/15 |
| 5,857,755 A | * | 1/1999 | Aoki et al. .................. 303/152 |
| 6,114,828 A | * | 9/2000 | Matsunaga et al. ......... 318/782 |
| 6,338,016 B1 | * | 1/2002 | Miller et al. .................. 701/43 |
| 2002/0125053 A1 | * | 9/2002 | Judkins |
| 2003/0085063 A1 | * | 5/2003 | Wakitani et al. |
| 2003/0176956 A1 | * | 9/2003 | Kowatari et al. |

FOREIGN PATENT DOCUMENTS

| | | | |
|---|---|---|---|
| JP | 08-191503 | 7/1996 | ........................ 3/6 |
| JP | 09-056182 | 2/1997 | ...................... 3/18 |
| JP | 3106853 | 9/2000 | ...................... 9/18 |

* cited by examiner

*Primary Examiner*—Christopher P. Ellis
*Assistant Examiner*—Christopher Bottorff
(74) *Attorney, Agent, or Firm*—Arent Fox, PLLC.

(57) ABSTRACT

In a hybrid vehicle 1 in which a transmission 14 is connected via a first clutch 13 to an internal combustion engine 11 and a first motor 12 that are coupled in series to front wheels Wf, a second motor 16 which is a three-phase brushless DC motor is connected to the transmission 14 via a second clutch 15. When the vehicle in an idling stop state of the internal combustion engine 11 is to be started, a motor output control portion 18 calculates a torque which is required of the second motor 16 in accordance with the inclination angle of the road surface on which the vehicle is traveling, and also a continuous energization time period T1 of a stator winding of one phase in the second motor 16.

2 Claims, 8 Drawing Sheets

APPARATUS FOR CONTROLLING A DRIVING FORCE OF AN ELECTRIC VEHICLE

BACKGROUND OF THE INVENTION

The present invention relates to an apparatus for controlling a driving force of an electric vehicle.

Conventionally, a vehicle is used on which a brushless DC motor such as a permanent magnet three-phase AC motor using permanent magnets for generating a magnetic field is mounted. In the case where such a vehicle is stopped halfway up a hill while applying a motor torque of a degree at which the vehicle does not reverse, or in a stall state where the traction motor is energized to generate a motor torque but rotation of the traction motor is stopped, a current flows through only a specific phase winding. In this case, among plural switching elements configured by semiconductor devices or the like constituting an inverter for outputting an AC power to drive the traction motor, only a switching element corresponding to the specific phase of the traction motor is set to "ON" state, and the current is supplied to the traction motor via the switching element. Consequently, there arises a problem in that the heat generation which is caused by energization of the windings of the traction motor and the inverter is concentrated into the specific phase winding and the specific switching element.

In order to solve the problem, a drive controlling apparatus for an electric automobile has been proposed in which, when a stall state continues beyond an allowable time period, a process of reducing a torque is conducted to protect a traction motor and power devices such as an inverter, and, when a control of reducing a torque command is to be performed, the reverse speed of the automobile is limited (for example, see Patent literature 1).

Also a motor controlling apparatus for an electric vehicle has been proposed in which, when a stall state is detected, a time period necessary for the junction temperature of a transistor constituting a switching element to reach a given upper limit temperature is calculated, and, when the duration time period of the stall state reaches the calculated time period, a current command value to a traction motor is limited (for example, see Patent literature 2).

Also a motor controlling apparatus for an electric automobile has been proposed in which, when a stall state is detected under the condition that the degree of an accelerator operation by the driver is larger than a predetermined level, the energization amount of a traction motor and a power circuit such as an inverter is limited (for example, see Patent literature 3).

[Patent Literature 1]
  Japanese patent No. 3,106,853

[Patent Literature 2]
  JP-A-9-56182

[Patent literature 3]
  JP-A-8-191503

In the above-mentioned controlling apparatuses of the conventional art, only a process such as that, when a stall state continues beyond a given time period, a torque command value or a current command value is reduced, or that, when a stall state is detected under the condition that the degree of an accelerator operation is larger than a predetermined level, the energization amount is limited is conducted. Consequently, there arises a problem in that the hill climbing ability of a vehicle is impaired. In order to enhance the hill climbing ability of a vehicle, for example, it is required to increase the capacity or heat resistance limit of switching elements constituting an inverter, and enhance the performance of a cooling device for cooling the traction motor and power devices such as the inverter. This causes problems in that the size of the apparatus is increased, and that the cost for configuration of the apparatus is raised.

SUMMARY OF THE INVENTION

The invention has been conducted in view of the above-mentioned circumstances. It is an object of the invention to provide an apparatus for controlling a driving force of an electric vehicle which can improve the ability of escaping out of a stall state while suppressing local heat generation of a traction motor and power devices such as an inverter.

(1) In order to solve the problems and attain the object, the apparatus for controlling a driving force of an electric vehicle according to the invention is an apparatus including: a traction motor (for example, a second motor 16 in an embodiment); a transmitting section (for example, a second clutch 15 in the embodiment) which is disposed between the traction motor and a drive wheel, and which transmits a driving force of the traction motor to the drive wheel; a driving force calculating section (for example, step S02 in the embodiment) which calculates the driving force of the traction motor on the basis of an operating state of a vehicle; and a motor controlling section (for example, a management ECU 26 in the embodiment) which controls the traction motor on the basis of the driving force calculated by the driving force calculating section, wherein the apparatus further inccludes a revolution number detecting section (for example, a second position detector 32 and a motor ECU 24 in the embodiment) which detects a number of revolutions of the traction motor, and, in a state where a change of the number of revolutions detected by the revolution number detecting section is equal to or smaller than a predetermined value and the driving force calculated by the driving force calculating section is equal to or larger than a predetermined value, when a driving duration time period of the traction motor reaches a predetermined time period (for example, a continuous energization time period T1 in the embodiment), the motor controlling section reduces a transmission amount of the driving force of the traction motor which is transmitted through the transmitting section (for example, step S06 in the embodiment).

According to the thus configured apparatus for controlling a driving force of an electric vehicle, in a state where the number of revolutions detected by the revolution number detecting section or a temporal change of the number of revolutions is equal to or smaller than a predetermined value including, for example, zero and the driving force calculated by the driving force calculating section is equal to or larger than a predetermined value, it is judged that the energization of a specific-phase winding of the traction motor is continued as in a stall state in an operation of starting the vehicle on an uphill slope, and a current continues to flow through specific power devices constituting an inverter for outputting an AC power for driving the traction motor, thereby producing the possibility that excessive local heat generation occurs in the specific phase (winding) of the traction motor and the specific power devices. When the driving duration time period of the traction motor under this state reaches the predetermined time period, the transmission amount of the driving force of the traction motor which is transmitted through the transmitting section is reduced. As a result, the traction motor is rotated relative to the drive wheel, and the energized phase of the traction motor is switched to another phase.

In a clutch serving as the transmitting section, for example, the engagement force of the clutch is temporarily reduced, and slippage occurs between paired clutch plates, so that the clutch plate on the side of the traction motor is rotated relative to that on the side of the drive wheel. As a result, the energized phase of the traction motor is switched to another phase.

According to the configuration, unlike the case where a torque command value or a current command value to a traction motor is reduced or the energization amount is simply limited, the ability of escaping out of a stall state, such as the hill climbing ability of the vehicle can be improved while preventing an overheat condition of the traction motor and power devices such as the inverter from occurring, without the necessities of causing the necessity of increasing the capacity or heat resistance limit of switching elements constituting the inverter, and enhancing the performance of a cooling device for cooling the traction motor and power devices such as the inverter.

(2) The apparatus for controlling a driving force of an electric vehicle according to the invention is an apparatus including: a traction motor (for example, the second motor 16 in the embodiment); a transmitting section (for example, the second clutch 15 in the embodiment) which is disposed between the traction motor and a drive wheel, and which transmits a driving force of the traction motor to the drive wheel; a driving force calculating section (for example, step S02 in the embodiment) which calculates the driving force of the traction motor on the basis of an operating state of a vehicle; and a motor controlling section (for example, the management ECU 26 in the embodiment) which controls the traction motor on the basis of the driving force calculated by the driving force calculating section, wherein the apparatus further includes a revolution number detecting section (for example, the second position detector 32 and the motor ECU 24 in the embodiment) which detects a number of revolutions of the traction motor, and, in a state where a change of the number of revolutions detected by the revolution number detecting section is equal to or smaller than a predetermined value and the driving force calculated by the driving force calculating section is equal to or larger than a predetermined value, when a driving duration time period of the traction motor reaches a predetermined time period (for example, the continuous energization time period T1 in the embodiment), the motor controlling section interrupts transmission of the driving force of the traction motor by the transmitting section (for example, step S11 in the embodiment), and, after elapse of a predetermined time period, restarts the transmission of the driving force (for example, step S13 in the embodiment).

According to the thus configured apparatus for controlling a driving force of an electric vehicle, in a state where the number of revolutions detected by the revolution number detecting section or a temporal change of the number of revolutions is equal to or smaller than a predetermined value including, for example, zero and the driving force calculated by the driving force calculating section is equal to or larger than a predetermined value, when the driving duration time period of the traction motor reaches the predetermined time period, transmission of the driving force of the traction motor through the transmitting section is interrupted for the predetermined time period. As a result, the traction motor is rotated relative to the drive wheel, and the energized phase of the traction motor is switched to another phase.

In a clutch serving as the transmitting section, for example, the engagement state of the clutch is temporarily canceled, and paired clutch plates respectively on the sides of the traction motor and the drive wheel are relatively rotated. As a result, the energized phase of the traction motor is switched to another phase.

According to the configuration, unlike the case where a torque command value or a current command value to a traction motor is reduced or the energization amount is simply limited, the ability of escaping out of a stall state, such as the hill climbing ability of the vehicle can be improved while preventing an overheat condition of the traction motor and power devices such as an inverter from occurring, without the necessities of increasing the capacity or heat resistance limit of switching elements constituting the inverter, and enhancing the performance of a cooling device for cooling the traction motor and power devices such as the inverter.

(3) The apparatus for controlling a driving force of an electric vehicle according to the invention is further characterized in that the apparatus further includes an inclination angle calculating section (for example, an inclination sensor 36 in the embodiment) which calculates an inclination angle of a road surface, and the driving force calculating section calculates the driving force of the traction motor on the basis of the inclination angle calculated by the inclination angle calculating section, and the operating state of the vehicle.

According to the thus configured apparatus for controlling a driving force of an electric vehicle, the traction motor is controlled in accordance with a driving force (such as a torque) which is calculated on the basis of the inclination angle of the road surface, in addition to the vehicle operating state including, for example, the degree of an accelerator operation by the driver of the vehicle, and the acceleration of the vehicle. Therefore, the ability of escaping out of a stall state, such as the hill climbing ability of the vehicle can be improved while more adequately preventing the traction motor and power devices such as an inverter from being overheated.

(4) The apparatus for controlling a driving force of an electric vehicle according to the invention is further characterized in that the traction motor is a brushless DC motor including: a rotor having permanent magnets; and plural-phase stator windings which generate a rotating magnetic field for rotating the rotor, and the motor controlling section calculates a continuous energization time period (for example, a continuous energization time period T1 in the embodiment) of one of the plural-phase stator windings on the basis of the driving force calculated by the driving force calculating section, and controls a state of transmission of the driving force of the traction motor through the transmitting section, on the basis of the continuous energization time period.

According to the thus configured apparatus for controlling a driving force of an electric vehicle, the motor controlling section calculates a command current value for the current to be supplied to the traction motor, on the basis of the driving force calculated by the driving force calculating section, such as a torque required of the traction motor, and then calculates a continuous energization time period of one of the plural-phase stator windings on the basis of the command current value. On the basis of the calculated continuous energization time period, for example, the timing of reducing the transmission amount of the driving force of the traction motor which is transmitted through the transmitting section, or that of interrupting transmission of the driving force of the traction motor through the transmitting section for the predetermined time period is set.

According to the configuration, the ability of escaping out of a stall state, such as the hill climbing ability of the vehicle can be improved while preventing the traction motor and power devices such as the inverter from being overheated.

(5) The apparatus for controlling a driving force of an electric vehicle according to the invention is an apparatus including: a traction motor (for example, the second motor 16 in the embodiment); a driving force calculating section (for example, step S02 in the embodiment) which calculates a driving force of the traction motor on the basis of an operating state of a vehicle; and a motor controlling section (for example, the management ECU 26 in the embodiment) which controls the traction motor on the basis of the driving force calculated by the driving force calculating section, wherein the apparatus further includes a revolution number detecting section (for example, the second position detector 32 and the motor ECU 24 in the embodiment) which detects a number of revolutions of the traction motor, in a state where a change of the number of revolutions detected by the revolution number detecting section is equal to or smaller than a predetermined value and the driving force calculated by the driving force calculating section is equal to or larger than a predetermined value, when a driving duration time period of the traction motor elapses a predetermined time period, the motor controlling section reduces an energization amount of the traction motor for a predetermined time period, and the apparatus further includes a fluid coupling (for example, a torque converter 41 in the embodiment) which is disposed between the traction motor and a drive wheel, and which transmits the driving force of the traction motor to the drive wheel.

According to the thus configured apparatus for controlling a driving force of an electric vehicle, in a state where the number of revolutions detected by the revolution number detecting section or a temporal change of the number of revolutions is equal to or smaller than a predetermined value including, for example, zero and the driving force calculated by the driving force calculating section is equal to or larger than a predetermined value, when the driving duration time period of the traction motor reaches the predetermined time period, the energization amount of the traction motor is reduced to a predetermined value including zero for a predetermined time period. According to the configuration, in the fluid coupling configured by a torque converter or the like, a difference in the number of revolutions is produced between the drive wheel and the traction motor. When the process of reducing the energization amount is ended after elapse of the predetermined time period, the energized phase of the traction motor after the reduction process is switched over from that before the process.

In the case where, in a stall state in an operation of starting the vehicle on an uphill slope, the vehicle begins to reverse as a result of the reduction of the energization amount of the traction motor, when the process of reducing the energization amount is ended and the traction motor is driven, the difference in the number of revolutions between a pump impeller of the torque converter on the side of the traction motor and a turbine runner on the side of the drive wheel is increased beyond the clutch point of the torque converter. A torque which is increased in accordance with the difference in the number of revolutions is transmitted to the drive wheel.

According to the configuration, unlike the case where a torque command value or a current command value to a traction motor is reduced or the energization amount is simply limited, the ability of escaping out of a stall state, such as the hill climbing ability of the vehicle can be improved while preventing an overheat condition of the traction motor and power devices such as the inverter from occurring, without the necessities of increasing the capacity or heat resistance limit of switching elements constituting the inverter, and enhancing the performance of a cooling device for cooling the traction motor and power devices such as the inverter.

(6) The apparatus for controlling a driving force of an electric vehicle according to the invention is further characterized in that the apparatus further includes an inclination angle calculating section (for example, the inclination sensor 36 in the embodiment) which calculates an inclination angle of a road surface, and the driving force calculating section calculates the driving force of the traction motor on the basis of the inclination angle calculated by the inclination angle calculating section, and the operating state of the vehicle.

According to the thus configured apparatus for controlling a driving force of an electric vehicle, the traction motor is controlled in accordance with a driving force (such as a torque) which is calculated on the basis of the inclination angle of the road surface, in addition to the vehicle operating state including, for example, the degree of an accelerator operation by the driver of the vehicle, and the acceleration of the vehicle. Therefore, the ability of escaping out of a stall state, such as the hill climbing ability of the vehicle can be improved while more adequately preventing the traction motor and power devices such as an inverter from being overheated.

(7) The apparatus for controlling a driving force of an electric vehicle according to the invention is further characterized in that the traction motor is a brushless DC motor including: a rotor having permanent magnets; and plural-phase stator windings which generate a rotating magnetic field for rotating the rotor, and the motor controlling section calculates a continuous energization time period (for example, the continuous energization time period T1 in the embodiment) of one of the plural-phase stator windings on the basis of the driving force calculated by the driving force calculating section, and controls the energization amount of the traction motor on the basis of the continuous energization time period.

According to the thus configured apparatus for controlling a driving force of an electric vehicle, the motor controlling section calculates a command current value for the current to be supplied to the traction motor, on the basis of the driving force calculated by the driving force calculating section, such as a torque required of the traction motor, and then calculates a continuous energization time period of one of the plural-phase stator windings on the basis of the command current value. On the basis of the calculated continuous energization time period, for example, a timing of reducing the transmission amount of the traction motor is set.

According to the configuration, the ability of escaping out of a stall state, such as the hill climbing ability of the vehicle can be improved while preventing the traction motor and power devices such as the inverter from being overheated.

DETAILED DESCRIPTION OF THE PREFERRED EMBODIMENTS

Hereinafter, an apparatus for controlling a driving force of an electric vehicle which is an embodiment of the invention will be described with reference to the accompanying drawings.

Figure 1:
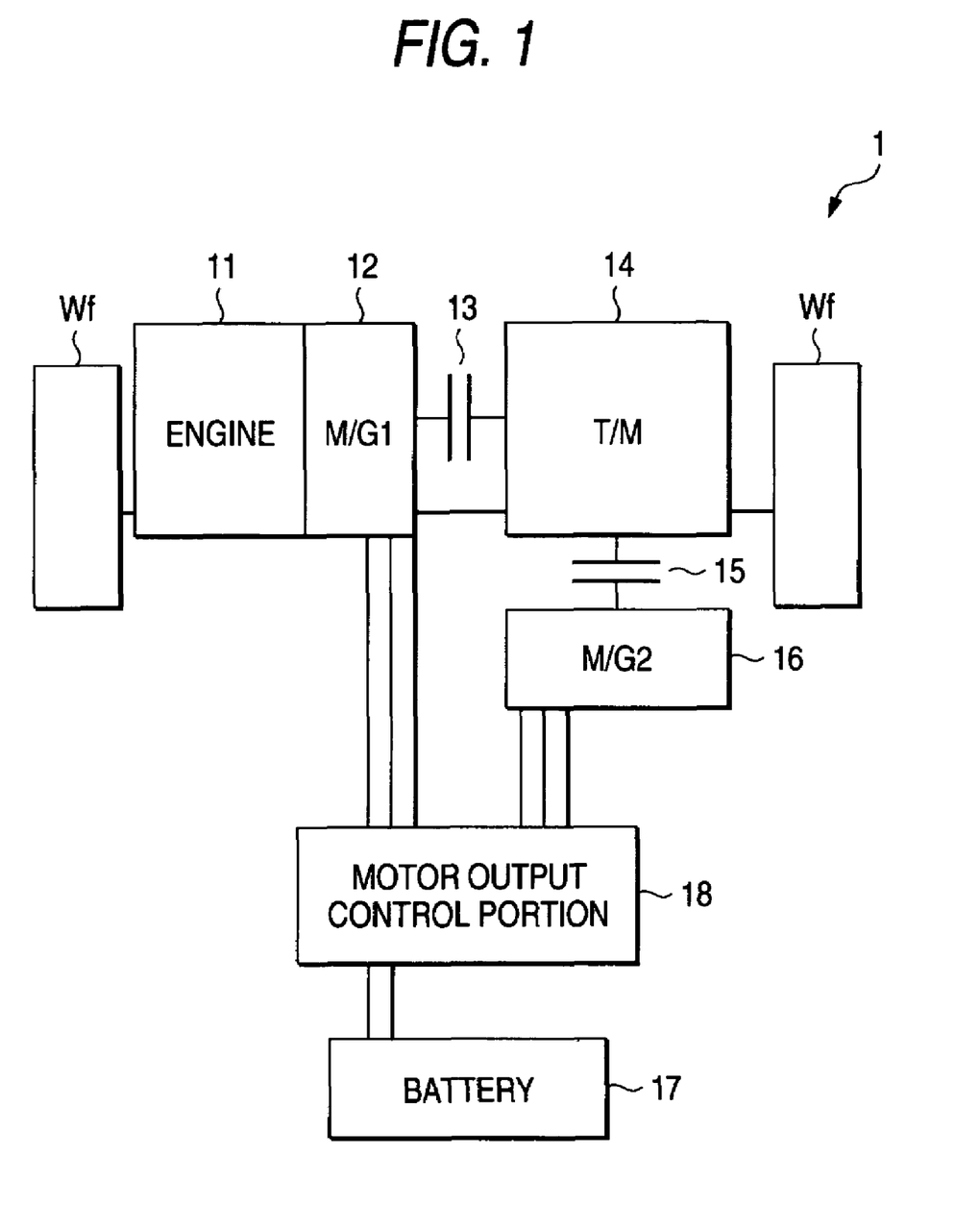
FIG. 1 is a diagram of a hybrid vehicle including an apparatus for controlling a driving force of an electric vehicle according to an embodiment of the invention.
Figure 2:
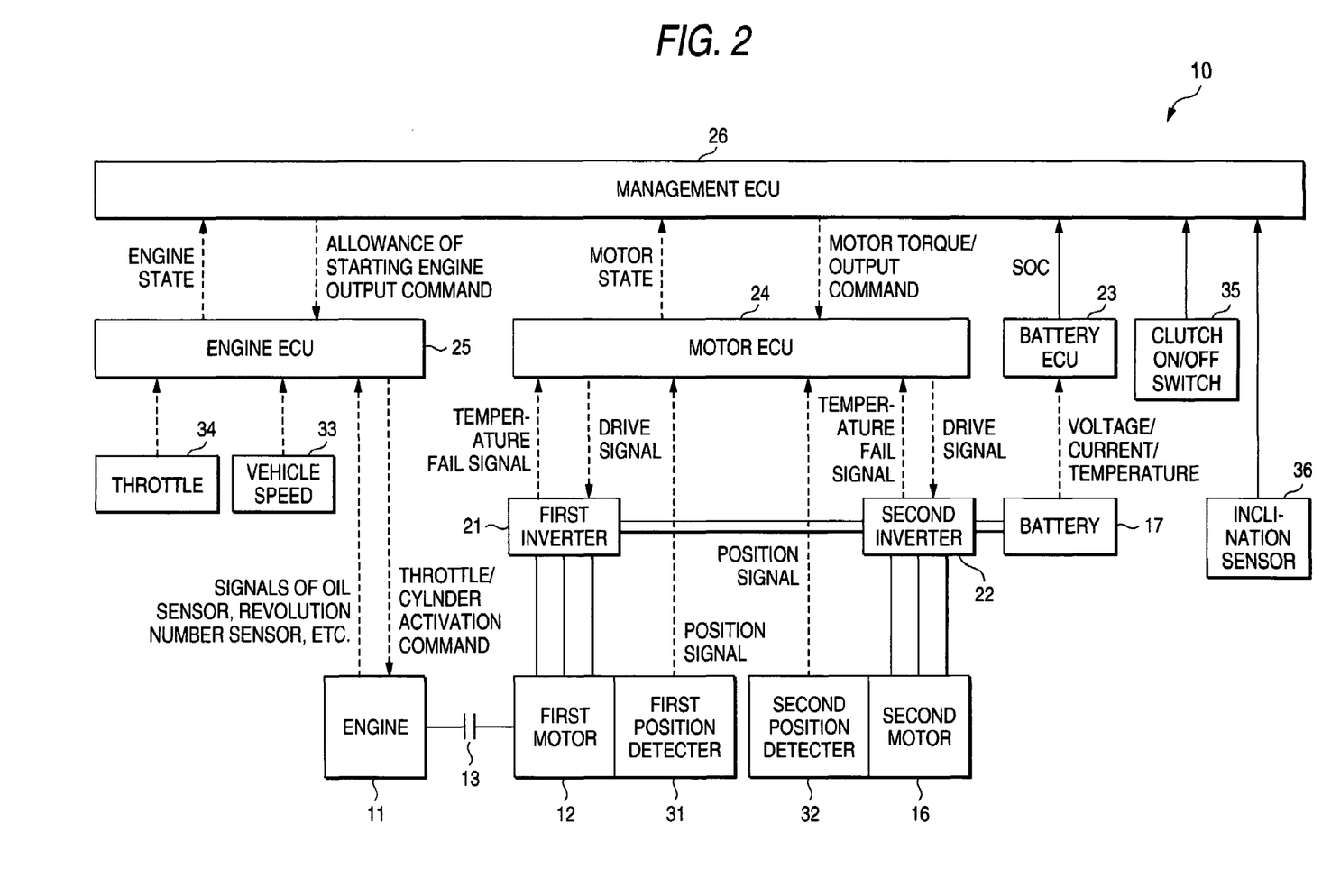
FIG. 2 is a diagram of the apparatus for controlling a driving force of an electric vehicle according to the embodiment of the invention.

As shown in FIGS. 1 and 2, the apparatus 10 for controlling a driving force of an electric vehicle of the embodiment is mounted on a hybrid vehicle 1 in which a transmission (T/M) 14 is connected via a first clutch 13 to an internal combustion engine 11 and a first motor (M/G1) 12 that are coupled in series to front wheels Wf. The apparatus includes a second motor 16 which is connected to the transmission 14 via a second clutch 15, a battery 17, and a motor output control portion 18. The motor output control portion 18 includes a first inverter 21, a second inverter 22, a battery ECU 23, a motor ECU 24, an engine ECU 25, and a management ECU 26.

In the hybrid vehicle 1, in an engagement state of the first clutch 13, the driving forces of both the internal combustion engine 11 and the first motor 12 are transmitted to the front wheels Wf via the transmission 14 such as an automatic transmission (AT), a CVT, or a manual transmission (MT).

When the vehicle in a stop state of the internal combustion engine 11 such as an idling stop state is to be started, the engagement of the first clutch 13 is canceled, and the engagement of the second clutch 15 is made in an engagement force variable manner, whereby the driving force of the second motor 16 is transmitted to the front wheels Wf.

When, during deceleration of the hybrid vehicle 1, a driving force is transmitted from the side of the front wheels W toward the first motor 12, the first motor 12 functions as a generator to generate a so-called regenerative braking force, so that the kinetic energy of the vehicle body is recovered as an electric energy.

Each of the motors 12, 16 is a brushless DC motor including a rotor having permanent magnets, and plural-phase (for example, three-phase) stator windings which generate a rotating magnetic field for rotating the rotor. The driving and regenerative operation of the first motor 12 are conducted in response to a control command from the motor ECU 24, by the first inverter 21 which is, for example, a PWM inverter performing pulse width modulation (PWM). Similarly, the driving of the second motor 16 is conducted in response to a control command from the motor ECU 24, by the second inverter 22 which is, for example, a PWM inverter performing pulse width modulation (PWM).

Each of the inverters 21, 22 having a bridge circuit in which plural switching elements are bridge-connected includes a signal output portion (not shown) which supplies to the motor ECU 24 a temperature fail signal indicating that the temperature of each switching element exceeds or is in danger of exceeding a given allowable temperature.

The high-voltage battery 17 which exchanges an electric energy with the motors 12, 16 is connected to the inverters 21, 22. In the battery 17, for example, a module in which plural cells are connected in series is used as one unit, and plural units of such modules are connected in series.

The inverters 21, 22 are connected in parallel to the battery 17.

The battery ECU 23 protects the battery 17 and calculates the battery SOC (State Of Charge). Therefore, detection signals from a current sensor (not shown) which detects input and output currents of the battery 17, a voltage sensor (not shown) which detects the terminal-to-terminal voltage of the battery 17, and a temperature sensor (not shown) which detects the temperature of the battery 17 are supplied to the battery ECU 23.

The motor ECU 24 controls the driving and regenerative operation of the first motor 12 and the driving of the second motor 16, and supplies to the management ECU 26 information relating to the operating state (motor state) of each of the motors 12, 16, such as the number of revolutions which is calculated based on a detection signal of magnetic pole positions of the motor 12, 16, a temporal change of the number of revolutions, and a continuous energization time period of a stator winding of a certain phase, in accordance with a driving or regenerative torque (motor torque) command, an output command, and the like supplied from the management ECU 26.

Therefore, the magnetic pole position detection signals of the motors 12, 16 which are output from position detectors 31, 32 disposed in the motors 12, 16, and temperature fail signals relating to the temperatures of the switching elements of the inverters 21, 22 are supplied to the motor ECU 24.

The engine ECU 25 controls operations of a fuel injection valve for adjusting the amount of the fuel supplied to the internal combustion engine 11, and a starter motor which are not shown, an operation of inactivating cylinders which can be inactivated, ignition timings, and the like in accordance with signals of allowance of starting the internal combustion engine 11 and an output command that are supplied from the management ECU 26. The engine ECU 25 supplies to the management ECU 26 information relating to the operating state (engine state) of the internal combustion engine 11, such as the number of revolutions, the oil pressure, the throttle opening, and the speed of the vehicle.

Therefore, detection signals from, for example, a revolution number sensor which detects the number of revolutions of the crank shaft, an oil pressure sensor, a vehicle speed sensor 33 which detects the speed of the vehicle, and a throttle opening sensor 34 which detects the throttle opening TH of a throttle valve are supplied to the engine ECU 25.

The management ECU 26 controls the battery ECU 23, the motor ECU 24, the engine ECU 25, a shift operation of the transmission 14, and the like.

As described later, the management ECU 26 detects the inclination angle of the road surface on which the vehicle is traveling, calculates the torques of the motors 12, 16 in accordance with the inclination angle and the operating state of the vehicle, and controls the engagement states of the clutches 13, 15 in accordance with the operating states (for example, the numbers of revolutions, and the temperatures) of the motors 12, 16.

In addition to the detection signal of the battery SOC output from the battery ECU 23, the information of the operating states of the motors 12, 16 output from the motor ECU 24, and that of the operating state of the internal combustion engine 11 output from the engine ECU 25, therefore, a signal relating to the engagement states of the clutches 13, 15 output from a clutch ON/OFF switch 35, and a detection signal output from an adequate inclination sensor 36 which detects the inclination of the road surface are supplied to the management ECU 26.

The apparatus 10 for controlling a driving force of an electric vehicle of the embodiment is configured as described above. Next, the operation of the apparatus 10 for controlling a driving force of an electric vehicle will be described.

In the following, the case where the vehicle on an uphill slope or the like and in a stop state in which the idling operation of the internal combustion engine 11 is stopped is to be started will be described. In this case, the engagement of the first clutch 13 is canceled, and the engagement of the second clutch 15 is made in an engagement force variable manner, whereby the vehicle is started by the driving force of the second motor 16.

Figure 3:
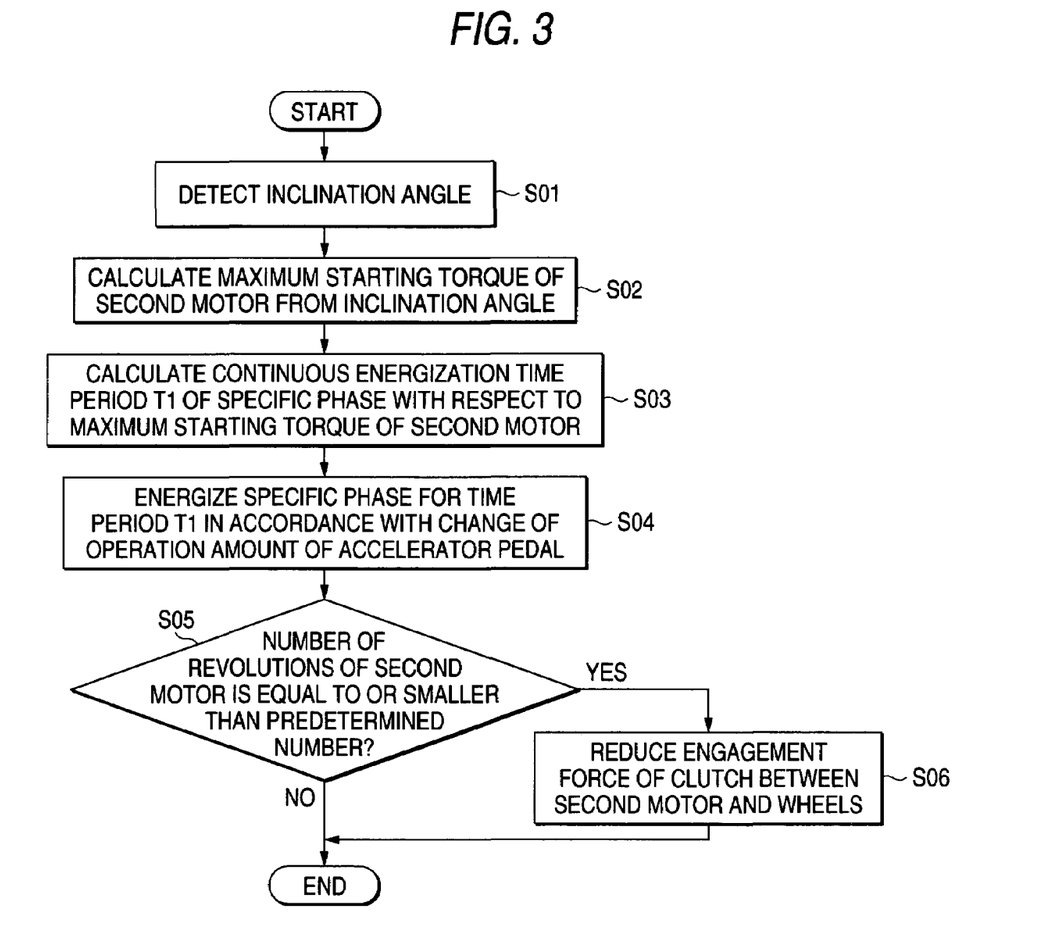
FIG. 3 is a flowchart showing the operation of the apparatus for controlling a driving force of an electric vehicle shown in FIG. 2.

In step S01 shown in FIG. 3, first, the inclination angle of the road surface on which the vehicle is traveling is detected on the basis of the detection signal output from the inclination sensor 36.

In step S02, the maximum starting torque which is required of the second motor 16, i.e., a torque which is equal to or larger than a predetermined value required for starting the vehicle while preventing the vehicle from reversing is calculated on the basis of the detected inclination angle.

In step S03, a continuous energization time period T1 of a stator winding of one phase in the second motor 16 is calculated in accordance with the calculated maximum starting torque.

In step S04, in a state where the engagement of the first clutch 13 is canceled and that of the second clutch 15 is made, the stator winding of one phase in the second motor 16 is energized for the calculated continuous energization time period T1 in accordance with a change of the amount of the accelerator operation by the driver (for example, a change of the depression amount of the accelerator pedal) In the second motor 16, the stator winding of the phase which is to be energized is adequately set according to the magnetic pole position of the second motor 16.

In step SO5, it is judged whether the number of revolutions of the second motor 16 is equal to or smaller than a predetermined number or not.

If the judgment result is "NO", the series of processes is ended.

By contrast, if the judgment result is "YES", the control proceeds to step S06.

In step S06, the engagement force of the second clutch 15 is reduced, and the series of processes is then ended.

Specifically, if the number of revolutions of the second motor 16 is equal to or smaller than a predetermined value including, for example, zero after the stator winding of one phase is energized for the calculated continuous energization time period T1 so that the torque of the second motor 16 is equal to the maximum starting torque, it is judged that the energization current continues to flow through the stator winding of the phase in the second motor 16 and the switching elements of the second inverter 22 corresponding to the energized phase and hence there is the possibility that excessive local heat generation occurs. In this case, when the engagement force of the second clutch 15 is temporarily reduced, slippage occurs between the pair of a clutch plate on the side of the front wheels Wf and that on the side of the second motor 16. Therefore, the transmission amount of the torque of the second motor 16 which is transmitted through the second clutch 15 is reduced, the second motor 16 is rotated relative to the front wheels Wf serving as driving wheels, and the energized phase of the second motor 16 is switched to another phase.

According to the apparatus 10 for controlling a driving force of an electric vehicle of the embodiment, in the stall state where the number of revolutions of the second motor 16 is equal to or smaller than the predetermined number and the torque of the second motor 16 is equal to or larger than the predetermined value, when the energization duration time period of the second motor 16 reaches the continuous energization time period T1, the engagement force of the second clutch 15 is temporarily reduced, whereby the energized phase in the power devices such as the second motor 16 and the second inverter 22 can be switched over. According to the configuration, unlike the case where a torque command value or a current command value to the second motor 16 is reduced or the energization amount is simply limited, the ability of escaping out of a stall state, such as the hill climbing ability of the vehicle can be improved while preventing an overheat condition of the power devices such as the second motor 16 and the second inverter 22 from occurring, without the necessities of causing the necessity of increasing the capacity or heat resistance limit of the switching elements constituting the second inverter 22, and enhancing the performance of a cooling device (not shown) for cooling the power devices such as the second motor 16 and the second inverter 22.

In the embodiment, in a case where there is the possibility that excessive local heat generation occurs the second motor 16 and the second inverter 22, the engagement force of the second clutch 15 is temporarily reduced as in step S06. The invention is not restricted to this. As in a first modification of the embodiment shown in FIG. 4, for example, the engagement of the second clutch 15 may be temporarily canceled to cause the second motor 16 to be idly rotated, and the engagement of the second clutch 15 may be then again made.

Figure 4:
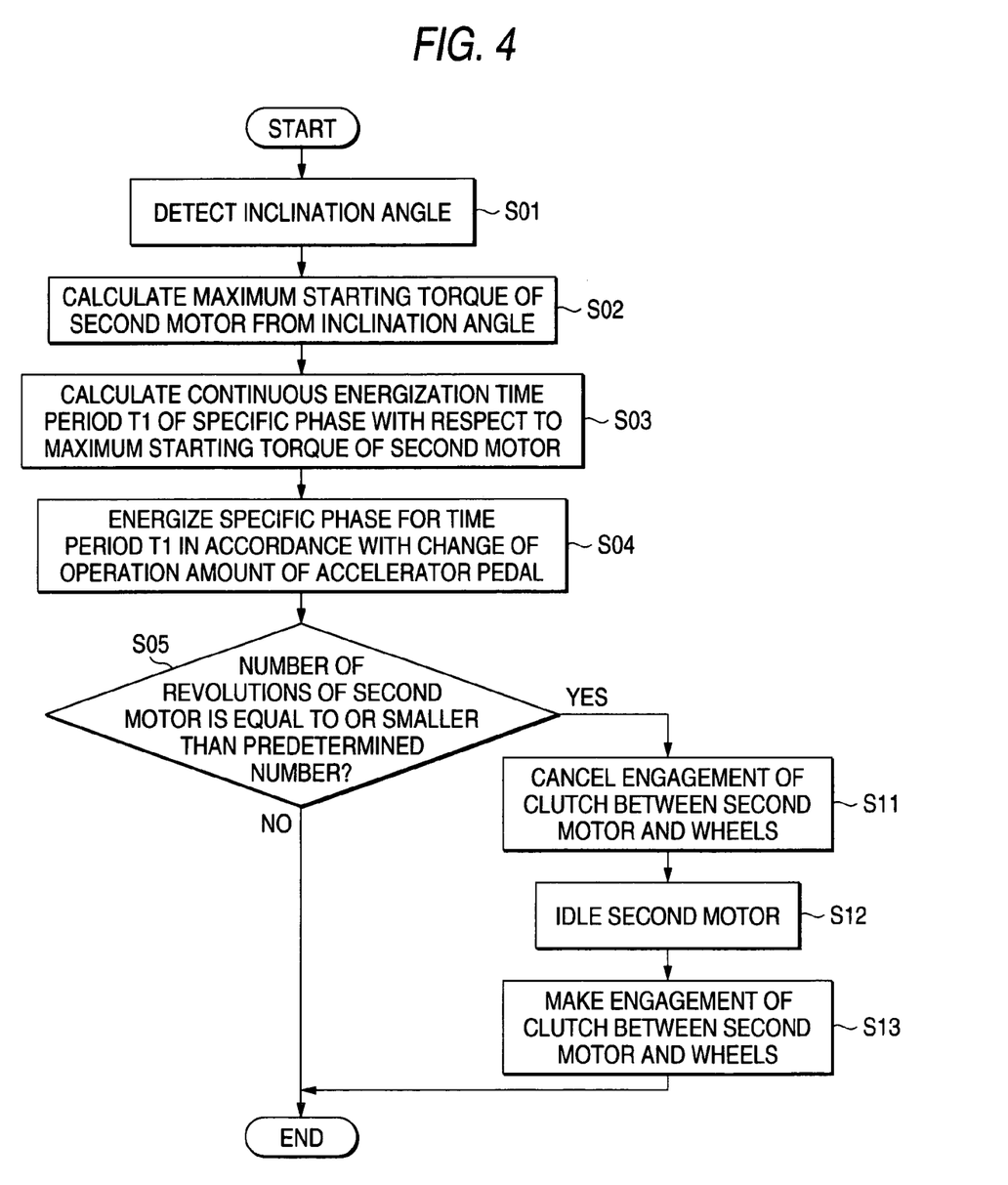
FIG. 4 is a flowchart showing the operation of an apparatus for controlling a driving force of an electric vehicle of a first modification of the embodiment.

In the first modification, namely, processes of steps S11 to S13 which will be described below are implemented in place of step S06 in the embodiment. In step S1, the engagement of the second clutch 15 is canceled to set a disconnection state.

In step S12, the disconnection state is maintained for a predetermined time period to cause the second motor 16 to be idly rotated relative to the front wheels Wf serving as driving wheels.

In step S13, the second clutch 15 is again set to the engagement state, and the series of processes is ended.

As a result, the energized phase of the second motor 16 after the disconnection state where the engagement of the second clutch 15 is cancelled can be switched over from that before the disconnection state.

In the embodiment, the second motor 16 is connected to the transmission 14 via the second clutch 15 so that the driving force of the second motor 16 is transmitted to the front wheels Wf. The invention is not restricted to this. As in a second modification of the embodiment shown in FIG. 5, for example, the second motor 16 may be connected to a rear differential DR via the second clutch 15 so that the driving force of the second motor 16 is transmitted to right and left rear wheels Wr via the rear differential DR which distributes the driving force among the rear wheels Wr.

Figure 5:
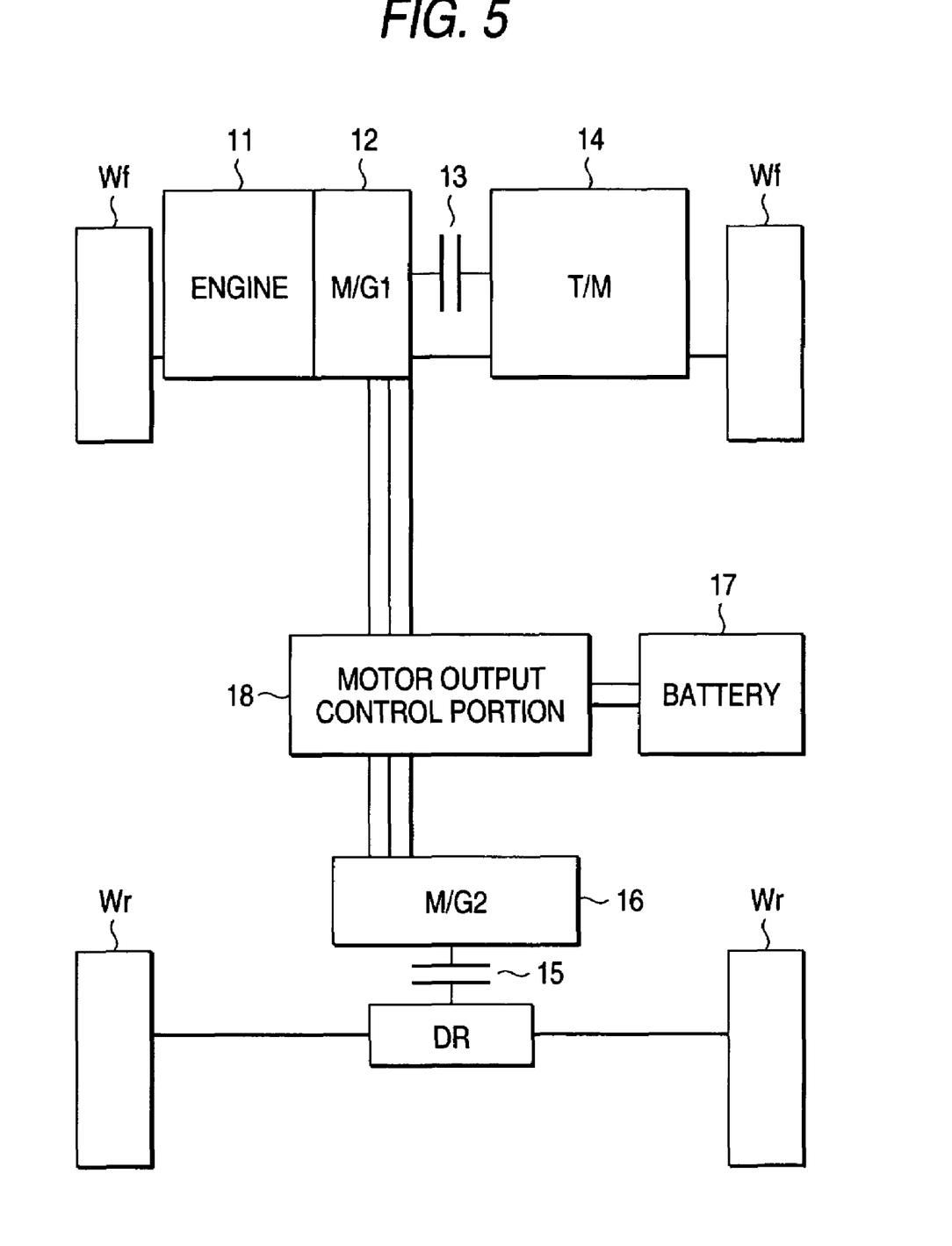
FIG. 5 is a diagram of a hybrid vehicle including an apparatus for controlling a driving force of an electric vehicle of a second modification of the embodiment.

In this case, when the engagement of the second clutch 15 is cancelled, a front-wheel drive system in which only the front wheels Wf are driven is established, and, when the engagement of the second clutch 15 is made, a four-wheel drive system in which the front wheels Wf and the rear wheels Wr are driven is established. When the engagement of the first clutch 13 is cancelled and the engagement of the second clutch 15 is made in an engagement force variable manner in, for example, an operation of starting the vehicle, a rear-wheel drive system is established.

In the embodiment, the second motor 16 is connected to the transmission 14 via the second clutch 15. The invention is not restricted to this. As in a third modification of the embodiment shown in FIG. 6, for example, the second motor 16 may be connected to the transmission 14 via a torque converter 41. Alternatively, as in a fourth modification of the embodiment shown in FIG. 7, the second motor 16 may be connected to the rear differential DR via the torque converter 41 so that the driving force of the second motor 16 is transmitted to the right and left rear wheels Wr via the rear differential DR which distributes the driving force among the rear wheels Wr.

Figure 8:
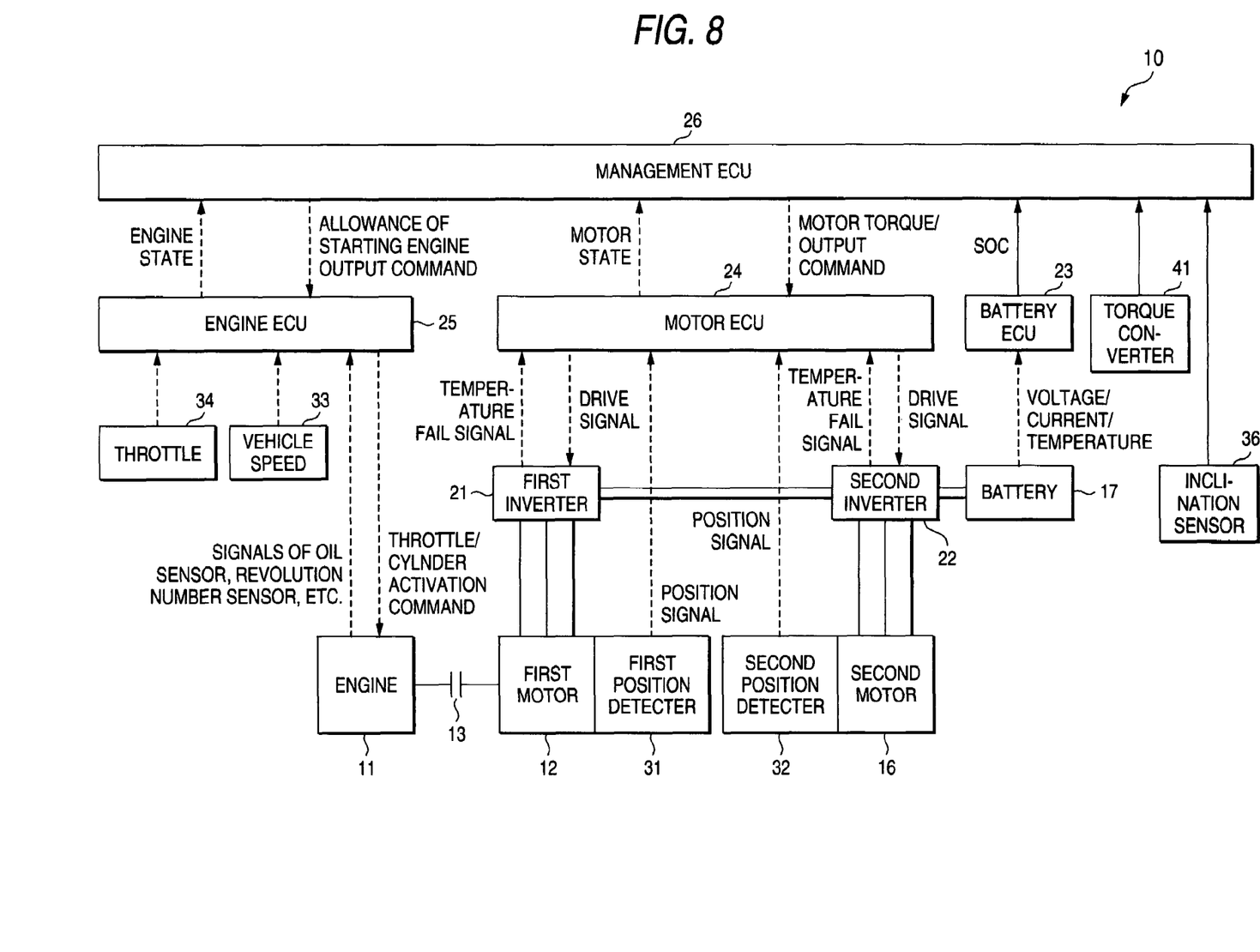
FIG. 8 is a diagram of the apparatus for controlling a driving force of the third or fourth modification of the embodiment.

In the third and fourth modifications of the embodiment, as shown in FIG. 8, the torque converter 41 is disposed in place of the clutch ON/OFF switch 35 in the embodiment, and signals such as those relating to engagement and disconnection states of a lockup clutch of the torque converter 41 are supplied to the management ECU 26.

Figure 6:
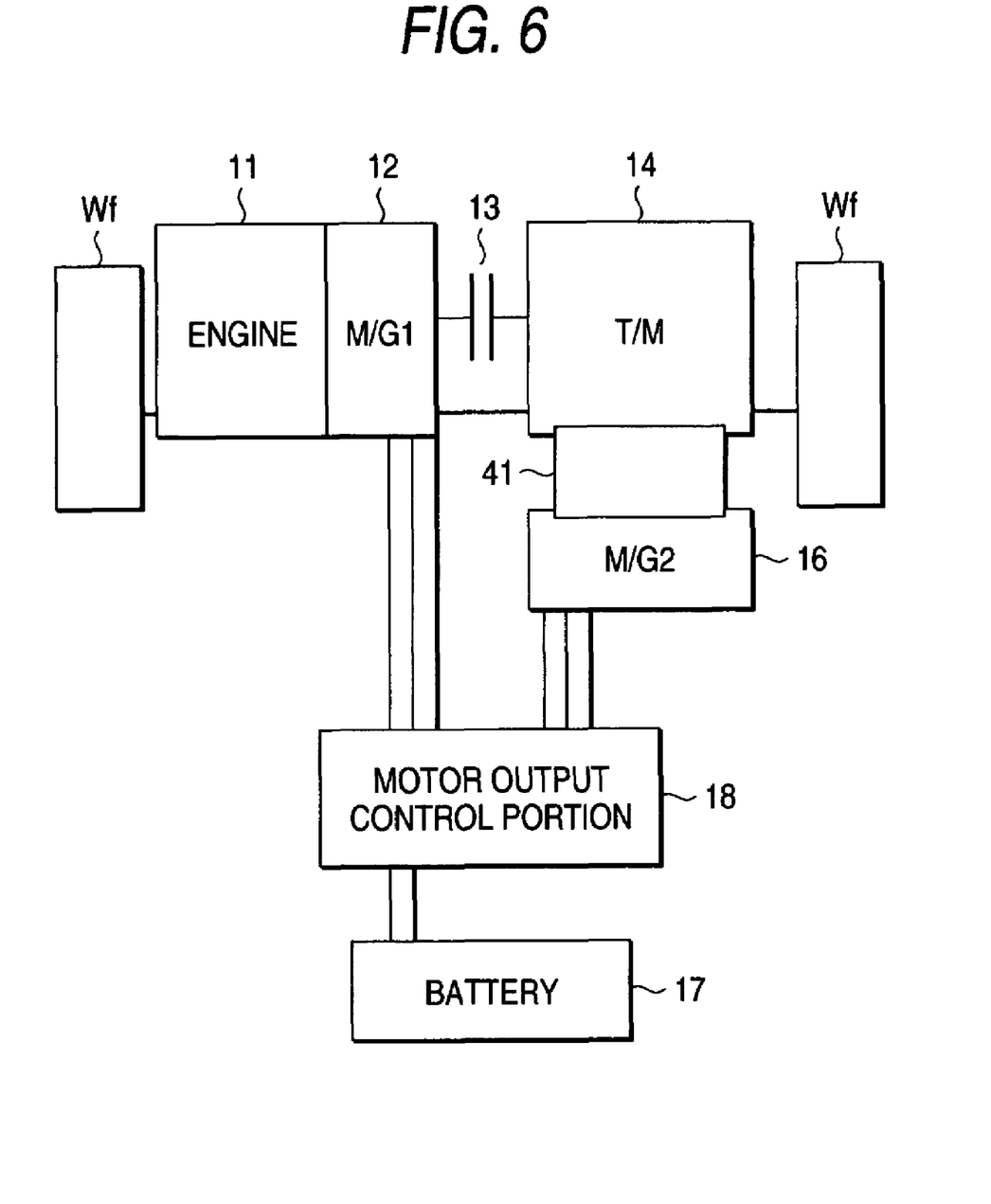
FIG. 6 is a diagram of a hybrid vehicle including an apparatus for controlling a driving force of an electric vehicle of a third modification of the embodiment.
Figure 7:
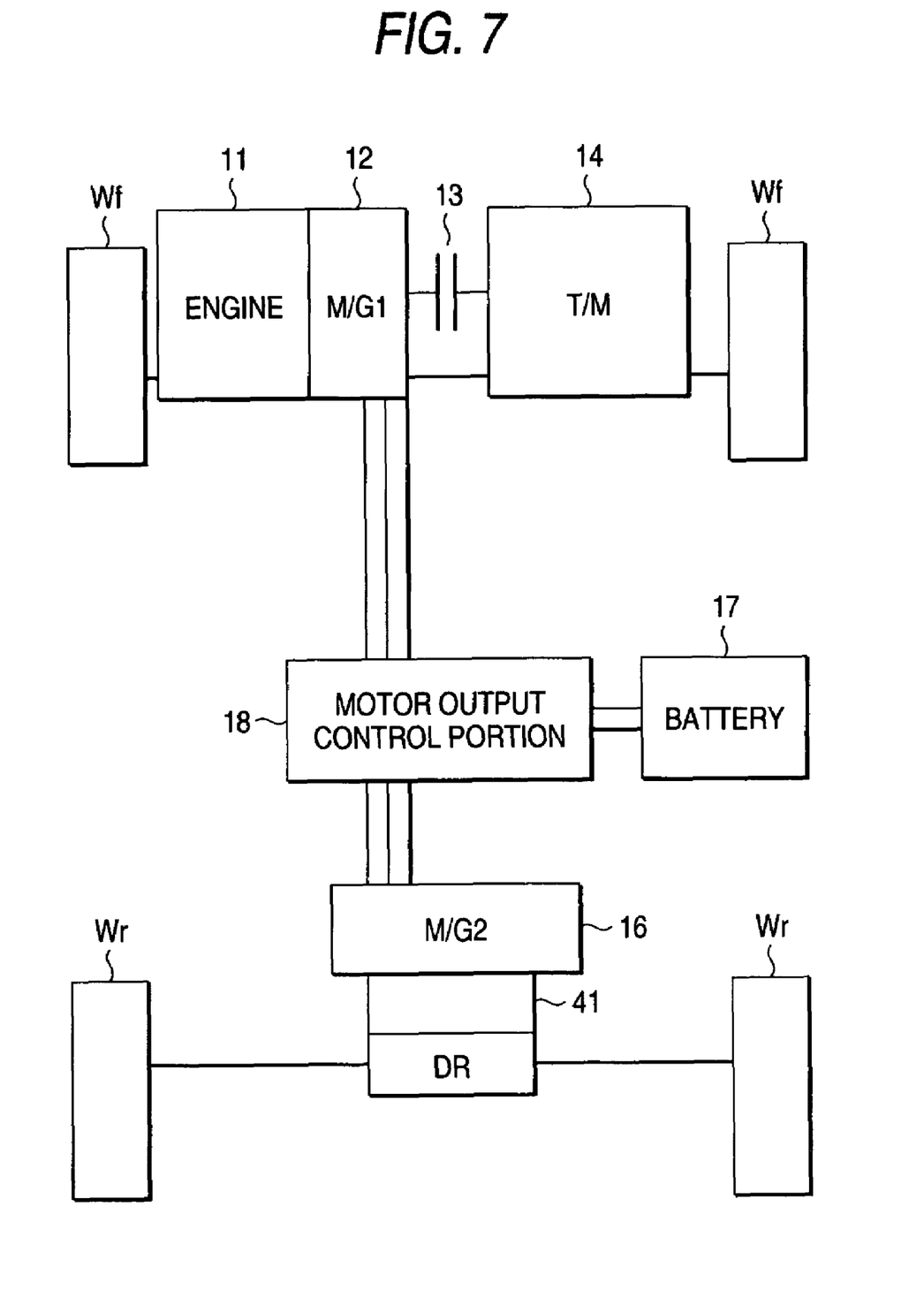
FIG. 7 is a diagram of a hybrid vehicle including an apparatus for controlling a driving force of an electric vehicle of a fourth modification of the embodiment.

In the third and fourth modifications of the embodiment, for example, a process of temporarily reducing the energization amount of the second motor 16 to a predetermined value including zero may be conducted in place of the processes of step S06 or step S11 to S13 in the embodiment.

In the case where, in a stall state in an operation of starting the vehicle on an uphill slope, the vehicle begins to reverse as a result of the reduction of the energization amount of the second motor 16, when the process of reducing the energization amount is ended and the second motor 16 is driven, the difference in the number of revolutions between a pump impeller in the torque converter 41 and connected to the second motor 16, and a turbine runner connected to the wheels (the front wheels Wf or the rear wheels Wr) is increased beyond the clutch point of the torque converter 41. A torque which is increased in accordance with the difference in the number of revolutions is transmitted to the wheels.

According to the configuration, the ability of escaping out of a stall state, such as the hill climbing ability of the vehicle can be improved while preventing an overheat condition of power devices such as the second motor 16 and the second inverter 22 from occurring.

In the embodiment, the first motor 12 is not restricted to a brushless DC motor, and may be a motor of another kind such as an induction motor having a cage rotor.

As described above, according to the apparatus for controlling a driving force of an electric vehicle of the invention, unlike the case where a torque command value or a current command value to a traction motor is reduced or the energization amount is simply limited, the ability of escaping out of a stall state, such as the hill climbing ability of the vehicle can be improved while preventing an overheat condition of a traction motor and power devices such as an inverter from occurring, without the necessities of increasing the capacity or heat resistance limit of switching elements constituting the inverter, and enhancing the performance of a cooling device for cooling the traction motor and power devices such as the inverter.

According to the apparatus for controlling a driving force of an electric vehicle of the invention of (3), the hill climbing ability of the vehicle can be improved while more adequately preventing the traction motor and power devices such as an inverter from being overheated, in accordance with the conditions of the road surface in addition to the operating state of the vehicle.

According to the apparatus for controlling a driving force of an electric vehicle of the invention of (4), the timing of reducing the transmission amount of the driving force of the traction motor which is transmitted through the transmitting section, or that of interrupting transmission of the driving force of the traction motor through the transmitting section for the predetermined time period can be adequately set. Therefore, the hill climbing ability of the vehicle can be improved while more adequately preventing the traction motor and power devices such as an inverter from being overheated.

According to the apparatus for controlling a driving force of an electric vehicle of the invention of (6), the hill climbing ability of the vehicle can be improved while more adequately preventing the traction motor and power devices such as an inverter from being overheated, in accordance with the conditions of the road surface in addition to the operating state of the vehicle.

According to the apparatus for controlling a driving force of an electric vehicle of the invention of (7), the timing of reducing the energization amount of the traction motor can be adequately set. Therefore, the hill climbing ability of the vehicle can be improved while more adequately preventing the traction motor and power devices such as an inverter from being overheated.

What is claimed is:

1. The apparatus for controlling a driving force of an electric vehicle comprising:
   a traction motor;
   a transmitting section which is disposed between said traction motor and a drive wheel, and which transmits a driving force of said traction motor to said drive wheel;
   a driving force calculating section which calculates the driving force of said traction motor on the basis of an operating state of a vehicle;
   a motor controlling section which controls said traction motor on the basis of the driving force calculated by said driving force calculating section, and
   a revolution number detecting section which detects a number of revolutions of said traction motor, wherein
   in a state where a change of the number of revolutions detected by said revolution number detecting section is equal to or smaller than a predetermined value and the driving force calculated by said driving force calculating section is equal to or larger than a predetermined value, when a driving duration time period of said traction motor reaches a predetermined time period, said motor controlling section reduces a transmission amount of the driving force of said traction motor which is transmitted through said transmitting section; and an inclination angle calculating section which calculates an inclination angle of a road surface, wherein said driving force calculating section calculates the driving force of said traction motor on the basis of the inclination angle calculated by said inclination angle calculating section, and the operating state of the vehicle.

2. The apparatus for controlling a driving force of an electric vehicle comprising:

a traction motor;

a transmitting section which is disposed between said traction motor and a drive wheel, and which transmits a driving force of said traction motor to said drive wheel;

a driving force calculating section which calculates the driving force of said traction motor on the basis of an operating state of a vehicle; and a motor controlling section which controls said traction motor on the basis of the driving force calculated by said driving force calculating section, and a revolution number detecting section which detects a number of revolutions of said traction motor, wherein in a state where a change of the number of revolutions detected by said revolution number detecting section is equal to or smaller than a predetermined value and the driving force calculated by said driving force calculating section is equal to or larger than a predetermined value, when a driving duration time period of said traction motor reaches a predetermined time period, said motor controlling section reduces a transmission amount of the driving force of said traction motor which is transmitted through said transmitting section, and further wherein said traction motor is a brushless DC motor comprising:

a rotor having permanent magnets; and plural-phase stator windings which generate a rotating magnetic field for rotating said rotor, and said motor controlling section calculates a continuous energization time period of one of said plural-phase stator windings on the basis of the driving force calculated by said driving force calculating section, and controls a state of transmission of the driving force of said traction motor through said transmitting section, on the basis of the continuous energization time period.

* * * * *